Dec. 12, 1933.  W. AGEY  1,938,572
PIE PAN
Filed Nov. 9, 1932  2 Sheets-Sheet 1

Inventor
Wallace Agey
By Clarence A. O'Brien
Attorney

Dec. 12, 1933.   W. AGEY   1,938,572
PIE PAN
Filed Nov. 9, 1932   2 Sheets-Sheet 2

Inventor
Wallace Agey
By Clarence A. O'Brien
Attorney

Patented Dec. 12, 1933

1,938,572

UNITED STATES PATENT OFFICE 1,938,572

PIE PAN

Wallace Arey, Kansas City, Mo., assignor to E. Gertrude McIntyre

Application November 9, 1932. Serial No. 641,922

5 Claims. (Cl. 53—6)

The present invention relates to a pie pan and has for its prime object to provide a pan in which the under crust of a pie may be baked as light and fluffy as the top crust.

Another very important object of the invention resides in the provision of a pie pan which is provided with a wire mesh bottom which permits more heat to get to the bottom crust thus cooking it more thoroughly.

Another very important object of the invention resides in the provision of a pie pan of this nature which is simple in its construction, inexpensive to manufacture, strong and durable, thoroughly efficient and reliable in use and otherwise well adapted to the purpose for which it is designed.

With the above and numerous other objects in view as will appear as the description proceeds, the invention consists in certain novel features of construction, and in the combination and arrangement of parts as will be hereinafter more fully described and claimed.

Figure 1:
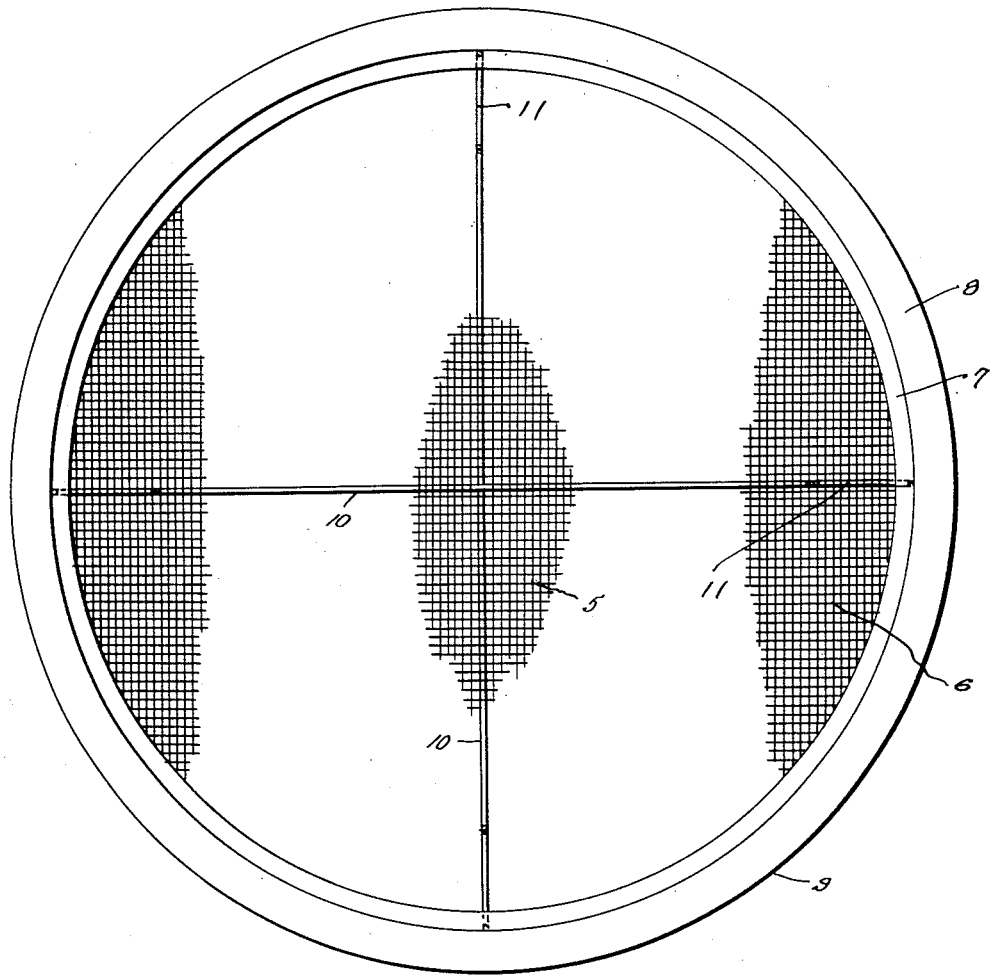
Figure 1 is a top plan view of a pie pan embodying the features of my invention.
Figure 2:
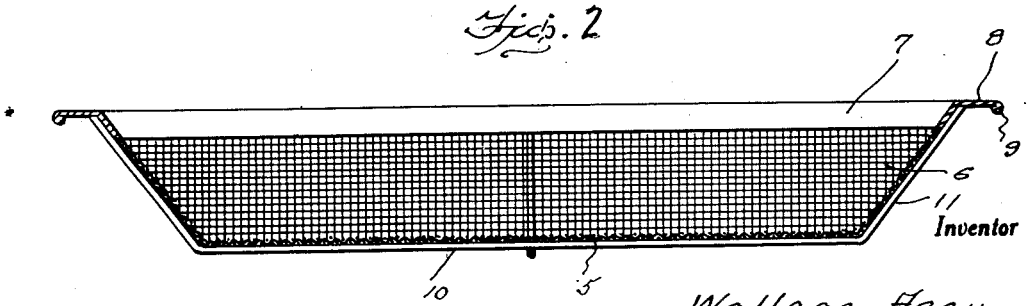
Figure 2 is a vertical diametric section therethrough.

Referring to the drawings in detail it will be seen that numeral 5 denotes a mesh wire bottom of circular construction merging at its edge into an upwardly extending inverted frusto-conical wire mesh flange 6. The upper edge of the flange 6 is secured by welding or any other suitable means to the bottom edge of a relatively narrow inverted frusto-conical band 7 the upper edge of which merges into an outwardly directed circular flange 8 terminating in a bead 9. The description thus far is common to both embodiments of the invention. Now referring particularly to Figures 1 and 2 it will be seen that numerals 10 denote cross wires extending under the bottom 5 diametrically with respect thereto at right angles to each other and terminating in upwardly outwardly slanting extensions 11 secured to the outer side of the flange 6 and the band 7.

Figure 3:
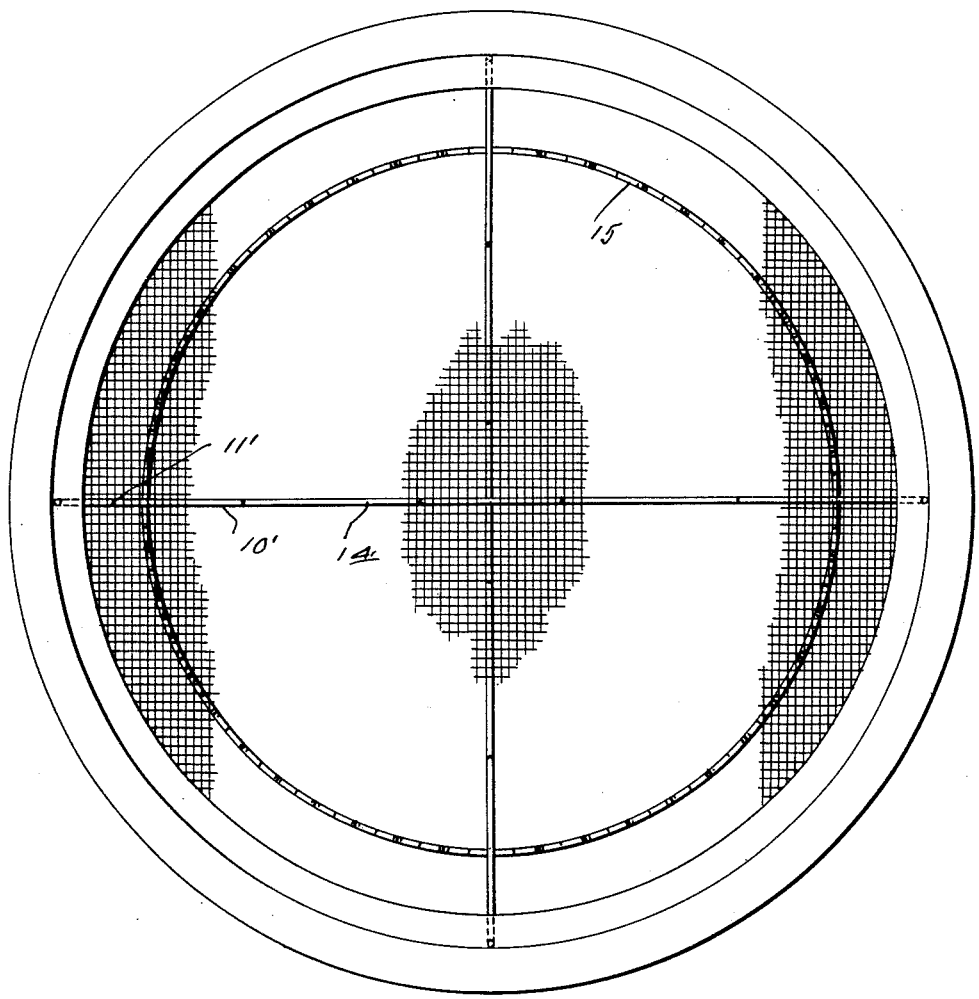
Figure 3 is a top plan view of another embodiment of the invention.
Figure 4:
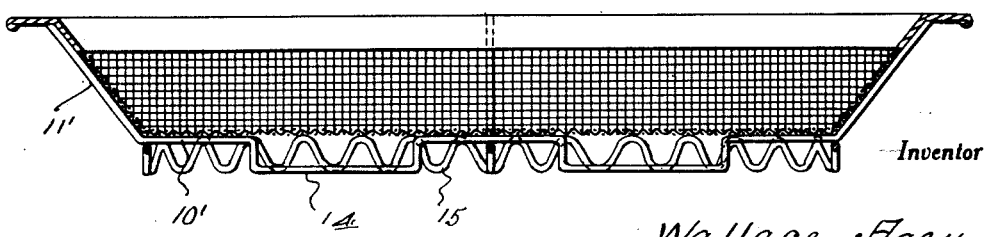
Figure 4 is a vertical diametric section therethrough.

In the embodiment of the invention shown in Figures 3 and 4 it will be seen that the cross wires 10' have a pair of downwardly offset portions 14 equidistant from the centers thereof and these wires 10' have extensions 11' similar to extensions 11. Numeral 15 denotes an annular piece of wire bent in a serrated or corrugated manner with the upper pumps secured to the bottom 5 adjacent the juncture of the flange 6 therewith. The height of the humps is equal to the extent of the offset 14 so that the pan will rest on the wire 15 and the offset 14 so as to allow ample circulation of the heat under the pan.

It will be quite apparent without a detail description that by the use of the pans disclosed herein the heat is permitted to get to the bottom crust and cook it just as thoroughly as the upper crust.

It is apparent that changes in the details of construction may be resorted to without departing from the spirit or scope of the invention as hereinafter claimed or sacrificing any of its advantages.

Having thus described my invention, what I claim as new is:

1. A pie pan of the class described comprising a wire mesh circular body merging at its outer edge into an upwardly directed inverted frusto-conical wire mesh flange, an inverted narrow frusto-conical band secured to the upper edge of the flange and terminating in an outwardly directed circular flange.

2. A pie pan of the class described comprising a wire mesh circular body merging at its outer edge into an upwardly directed inverted frusto-conical wire mesh flange, an inverted narrow frusto-conical band secured to the upper edge of the flange and terminating in an outwardly directed circular flange, a pair of wires fixed under the bottom and disposed diametrically thereacross and crossing each other at right angles and terminating in upwardly and outwardly disposed extensions secured to the wire mesh flanges and band on their outer sides.

3. A pie pan of the class described comprising a wire mesh circular body merging at its outer edge into an upwardly directed inverted frusto-conical wire mesh flange, an inverted narrow frusto-conical band secured to the upper edge of the flange and terminating in an outwardly directed circular flange, a pair of wires fixed under the bottom and disposed diametrically thereacross and crossing each other at right angles and terminating in upwardly and outwardly disposed extensions secured to the wire mesh flanges and band on their outer sides, said wires having downwardly offset portions intermediate their centers and outer ends.

4. A pie pan of the class described comprising a wire mesh circular body merging at its outer edge into an upwardly directed inverted frusto-conical wire mesh flange, an inverted narrow frusto-conical band secured to the upper edge of the flange and terminating in an outwardly directed circular flange, a pair of wires fixed under the bottom and disposed diametrically thereacross and crossing each other at right angles and terminating in upwardly and outwardly disposed extensions secured to the wire mesh flanges and band on their outer sides, said wires having downwardly offset portions intermediate their centers and outer ends, a circular piece of wire of corrugated or serrated formation secured under the bottom.

5. A pie pan of the class described comprising a wire mesh circular body merging at its outer edge into an upwardly directed inverted frusto-conical wire mesh flange, an inverted narrow frusto-conical band secured to the upper edge of the flange and terminating in an outwardly directed circular flange, a circular piece of corrugated wire secured under the bottom.

WALLACE AGEY.